June 17, 1924.

H. A. D. BAER

SAFETY LAMP

Filed Nov. 18, 1922

1,498,502

WITNESSES
Frederick Diehl.
E. W. Savage

INVENTOR
H. A. D. Baer
BY Munn & Co
ATTORNEYS

Patented June 17, 1924.

1,498,502

UNITED STATES PATENT OFFICE.

HARRY A. D. BAER, OF ALLENTOWN, PENNSYLVANIA.

SAFETY LAMP.

Application filed November 18, 1922. Serial No. 601,768.

*To all whom it may concern:*

Be it known that I, HARRY A. D. BAER, a citizen of the United States, and a resident of Allentown, in the county of Lehigh and State of Pennsylvania, have invented new and useful Improvements in Safety Lamps, of which the following is a full, clear, and exact description.

This invention relates to safety devices primarily designed for use with motor vehicles.

In driving motor vehicles at night a great deal of difficulty is experienced in estimating the distance of one motor vehicle from another. Inability of a driver to locate the left front portion of an approaching vehicle often results in serious accidents and in some cases the destruction of life.

The general object of this invention is the provision of a cheap, simple and efficient device for mounting on a vehicle to illuminate any portion of it or the ground beneath the said portion of the vehicle in order to assist others in determining the location of the vehicle.

A further object of the invention is the provision of a safety device for use with motor vehicles for signaling to an approaching driver the outer line of the vehicle.

This object is accomplished by providing a cylindrical casing of opaque material having an elongated slot in one side for receiving a lens and an opening in one end in which a second lens is mounted, mounting in the casing a lamp for projecting rays of light through said lenses, and mounting on the casing means for attaching to any part of the vehicle in a horizontal position to illuminate any portion of the vehicle or the ground beneath that portion, and to throw a beam of light forward to indicate the location of a particular portion of the vehicle.

These and other objects of the invention will be more clearly understood from the following detailed description and accompanying drawings.

Figure 1:
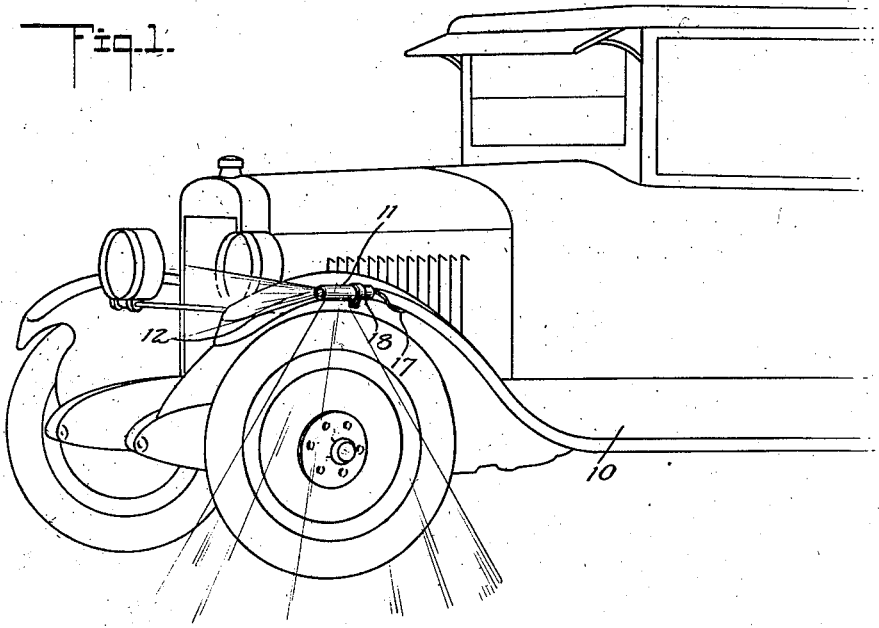
Figure 1 is a perspective view of an automobile showing the device mounted in position on the front mud guard of the left side.
Figure 2:
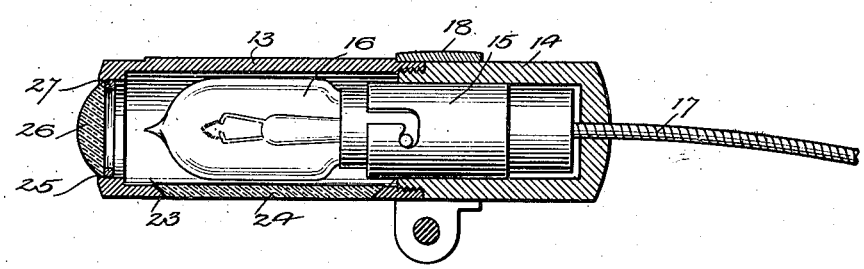
Figure 2 is a vertical section through the casing showing the construction of the safety device.
Figure 3:
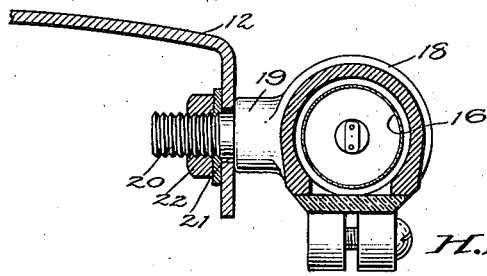
Figure 3 is a vertical cross section of the device.

Referring to the above-mentioned drawings, a motor vehicle 10 is shown with a safety device 11 mounted on its left front mud guard 12. The safety device includes a casing consisting of a front section 13, one end of which is provided with an internal thread, and a rear section 14 having an external thread cut on one end for engaging in the internal thread of the front section 13. Mounted in the rear section 14 of the casing is a socket 15 which makes electrical contact with the section 14 of the casing. An electric bulb 16 is mounted in the socket 15 and is used for illuminating purposes. The socket 15 and the bulb 16 are standard articles and consequently not set forth in detail. One conductor 17 only extends from the source of electricity and connects with the terminal of the socket which does not make electrical contact with the section 14 of the casing. In order to hold the casing together a clamp 18 is mounted thereon at the point of juncture of the sections 13 and 14. This clamp is provided with a stud 19 having a threaded portion 20 which projects through an opening 21 in the mud guard 12. This stud is retained in position by means of a nut 22. Thus by means of the clamp and stud the safety device may be attached to the mud guard to retain it in a horizontal position.

An elongated opening 23 is cut in the side of the front section 13 of the casing. A lens 24 is mounted in this opening 23 in alinement with the bulb 16. Another opening 25 is cut in the forward end of the front section 13 of the casing and a lens 26 is mounted in this opening and retained in position by means of a ring 27. The lens 26 would be so constructed as to focus the rays of light at a short distance in front of it so as to eliminate all possibility of glare which might affect approaching drivers.

The operation of this safety device is as follows:

It is supplied with current from any suitable source of electric energy through a single conductor 17. This conductor connects with the terminal of the socket 15 that is not grounded and current flows through conductor 17, said terminal of the socket 15, through bulb 16, through the grounded terminal of the socket 15 and back through ground to the source of electric energy. The lens 24 focuses the light rays so as to illuminate the left front wheel and the ground for a distance of a foot to the front and to the rear of the wheel. The light rays passing through the lens 26 are focused a short distance in front of the same and serve as a means for indicating the location of the outer line of the vehicle. If the driver of the vehicle turns out his left lamp the rays from the safety device can be more easily observed and the location of the vehicle determined with greater certainty.

I would state in conclusion that while the illustrated example constitutes a practical embodiment of my invention, I do not limit myself strictly to the exact details herein ilustrated since manifestly the same can be considerably varied without departing from the spirit of the invention as defined in the appended claims.

Claims:

1. A device of the character described for use with vehicles, a casing formed of two tubular sections having a screw threaded connection with each other, one of the sections having a lens in its end and one side, and the other section having an apertured end, an electric lamp socket mounted in the other section of the casing with one terminal making electrical contact with the said section, a lamp mounted in the socket and projecting into the section of the casing having the lenses, a single conductor leading from the other terminal of the socket out through the aperture of the end of the section carrying the socket, and means on the casing for securing it to a vehicle.

2. A device of the character described for mounting on vehicles to illuminate the ground beneath particular portions of the vehicle and to indicate the outer lines of the vehicle, comprising a two-section tubular casing, the top section having an elongated slot cut in its wall and an opening formed in its end, the base section of the casing having a lamp socket mounted therein so that one terminal makes electrical connection with the base section, said top section being provided with an internal thread while the base section is provided with an external thread for engaging the internal thread of the top section to connect the two sections together, a bulb mounted in said socket, lenses mounted in the openings provided in the top section of the casing for focusing the rays of light from the bulb, and a clamp encircling the casing at a point of juncture of the sections, said clamp being provided with means for attaching it to the vehicle.

HARRY A. D. BAER.